United States Patent
Hahn et al.

(10) Patent No.: US 10,125,244 B2
(45) Date of Patent: Nov. 13, 2018

(54) RUBBER COMPOSITION WITH PRECIPITATED SILICA PARTIALLY PRE-HYDROPHOBATED WITH ALKYLSILANE COUPLED TO AN ELASTOMER IN SITU WITHIN THE RUBBER COMPOSITION AND TIRE WITH COMPONENT

(71) Applicant: The Goodyear Tire & Rubber Company, Akron, OH (US)

(72) Inventors: Bruce Raymond Hahn, Hudson, OH (US); George Jim Papakonstantopoulos, Medina, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 138 days.

(21) Appl. No.: 15/210,941

(22) Filed: Jul. 15, 2016

(65) Prior Publication Data

US 2017/0029604 A1 Feb. 2, 2017

Related U.S. Application Data

(60) Provisional application No. 62/197,609, filed on Jul. 28, 2015.

(51) Int. Cl.
| | |
|---|---|
| *C08L 9/06* | (2006.01) |
| *C08K 3/04* | (2006.01) |
| *C08K 5/548* | (2006.01) |
| *C08K 9/06* | (2006.01) |
| *C08K 3/36* | (2006.01) |

(52) U.S. Cl.
CPC ............. *C08L 9/06* (2013.01); *C08K 3/04* (2013.01); *C08K 5/548* (2013.01); *C08K 9/06* (2013.01); *C08K 3/36* (2013.01); *C08L 2201/08* (2013.01); *C08L 2205/02* (2013.01); *C08L 2205/06* (2013.01)

(58) Field of Classification Search
CPC .... C08L 9/06; C08L 2201/08; C08L 2205/02; C08L 2205/06; C08K 3/04; C08K 5/548; C08K 3/36; C08K 9/00; C08K 9/06
USPC ........................................................ 524/444
See application file for complete search history.

(56) References Cited

U.S. PATENT DOCUMENTS

| | | | |
|---|---|---|---|
| 4,474,908 A | 10/1984 | Wagner | |
| 5,064,901 A | 11/1991 | Machado | |
| 5,780,538 A | 7/1998 | Cohen et al. | |
| 6,022,923 A * | 2/2000 | Araki | B60C 1/0016 152/209.1 |
| 6,515,063 B2 * | 2/2003 | Zanzig | B60C 1/0016 524/115 |
| 6,573,324 B1 | 6/2003 | Cohen et al. | |
| 6,608,145 B1 * | 8/2003 | Lin | C08K 3/36 524/262 |
| 6,830,811 B2 | 12/2004 | Chao | |
| 7,569,107 B2 | 8/2009 | Boyer et al. | |
| 2004/0192825 A1 | 9/2004 | Zanzig et al. | |
| 2013/0310501 A1 | 11/2013 | Zhao et al. | |
| 2014/0088224 A1 | 3/2014 | Sandstrom et al. | |

FOREIGN PATENT DOCUMENTS

EP 721971 A1 7/1996

* cited by examiner

*Primary Examiner* — Josephine L Chang
(74) *Attorney, Agent, or Firm* — Henry C. Young, Jr.

(57) ABSTRACT

The invention relates to a rubber composition containing diene based elastomer(s) coupled with a silica coupler in situ in the rubber composition to a precipitated silica which is partially pre-hydrophobated with an alkylsilane comprised of an alkoxyalkylsilane, its preparation and to a tire containing a component comprised of such rubber composition.

4 Claims, No Drawings

RUBBER COMPOSITION WITH PRECIPITATED SILICA PARTIALLY PRE-HYDROPHOBATED WITH ALKYLSILANE COUPLED TO AN ELASTOMER IN SITU WITHIN THE RUBBER COMPOSITION AND TIRE WITH COMPONENT

FIELD OF INVENTION

The invention relates to a rubber composition containing diene based elastomer(s) coupled with a silica coupler in situ in the rubber composition to a precipitated silica which is partially pre-hydrophobated with an alkylsilane, its preparation and to a tire containing a component comprised of such rubber composition.

BACKGROUND OF THE INVENTION

Vehicular tires may be prepared with a component of a rubber composition which contains reinforcing filler comprised of a combination of precipitated silica and rubber reinforcing carbon black. The precipitated silica is usually provided with a silica coupling agent (silica coupler) to enhance its rubber reinforcement by coupling precipitated silica to a conjugated diene based elastomer contained in the rubber composition.

Precipitated silica is generally hydrophilic in nature and therefore has a greater affinity to itself, namely to other hydrophilic precipitated silicas, with less affinity to a diene-based elastomer in a rubber composition which, in turn, makes it difficult to obtain a satisfactory dispersion of the precipitated silica throughout the rubber composition. Such difficulty of obtaining a dispersion of hydrophilic precipitated silica is well known to those having skill in such art.

In practice, the precipitated silica may be hydrophobated to promote a greater affinity to a diene based elastomer in a rubber composition and to thereby enable a more satisfactory dispersion of precipitated silica in a rubber composition.

The precipitated silica may be hydrophobated, for example, with an alkylsilane in a form of, for example, a halogenated alkylsilane or alkoxyalkylsilane to react with hydroxyl groups on the precipitated silica. It may also be hydrophobated with a silica coupling agent where the coupling agent contains a moiety (e.g. alkoxysilane moiety) to react with hydroxyl groups on the silica and another different moiety (e.g. polysulfide moiety) interactive with the diene-based elastomer(s) of the rubber composition to thereby render the precipitated silica more readily dispersible in the rubber composition.

Precipitated silica may be pre-hydrophobated prior to its introduction into the rubber composition or may be in situ hydrophobated within the rubber composition.

However, it is readily seen that such pre-hydrophobation of the precipitated silica with an alkylsilane (by way of a reaction with a halogenated alkyl silane or alkoxysilane) can render the hydrophobated precipitated silica significantly unreactive, or only minimally reactive, with a subsequent addition of silica coupling agent. Such pre-hydrophobation thereby eliminates a significant portion of hydroxyl group sites on the precipitated silica available to subsequently react with a silica coupling agent which is added subsequently in situ within the rubber composition. Therefore, while such pre-hydrophobation promotes dispersion of the precipitated silica in the rubber composition, it can prevent significant subsequent coupling of the precipitated silica to a diene-based elastomer contained in a rubber composition with a silica coupling agent.

Exemplary of hydrophobation of precipitated silica, and not intended to be limiting, may be found, for example, U.S. Pat. Nos. 4,474,908, 5,780,538 and 6,573,324.

For this invention, it is desired to evaluate dispersion (dispersability) of precipitated silica in a rubber composition containing a diene-based elastomer followed by coupling of the dispersed precipitated silica to a diene based elastomer contained in the rubber composition to thereby both promote stabilization of the dispersed precipitated silica within the rubber composition and to promote reinforcement of the rubber composition.

To enable such combination, it is desired to evaluate partially pre-hydrophobating a precipitated silica to promote its dispersability in the rubber composition while promoting a significant retention of residual unreacted hydroxyl groups on the precipitated silica followed by coupling the dispersed partially pre-hydrophobated precipitated silica by reaction of its residual hydroxyl groups with a silane containing (e.g. alkoxysilane containing) silica coupling agent in situ within a rubber composition which contains a conjugated diene based elastomer.

It therefore is desired to provide such partial pre-hydrophobation of precipitated silica with the alkylsilane exclusive of silica coupling agent during such pre-hydrophobation to prevent an inherent competition of the alkylsilane with silica coupling agent for hydroxyl groups on the precipitated silica during such partial pre-hydrophobation.

While such partial pre-hydrophobation of precipitated silica to promote its dispersibility combined with a subsequent and separate coupling with a coupling agent to a rubber composition may appear to be relatively straight forward in nature, it is however believed an innovative methodology and resultant product of this application is a significant departure from past practice. (for example, see U.S. Pat. Nos. 6,573,324, 6,830,811 and 7,569,107), where hydrophobation of a precipitated silica was provided with a combination of alkylsilane and silica coupling agent.

The partial pre-hydrophobation of the silica surface with an alkylsilane prior to the in-situ addition of the coupling agent allows for simple dispersion of the partially pre-hydrophobated silica within the rubber matrix prior to coupling of that pre-hydrophobated silica with the rubber matrix with the silica coupler through residual hydroxyl groups remaining on the precipitated silica after its pre-hydrophobation. The subsequent reaction of a silica coupler is provided to stabilize the dispersed pre-hydrophobated silica within the rubber as well as to reinforce the rubber itself by reaction of the added silica coupler with available and accessible residual hydroxyl (e.g. silanol) groups contained on the pre-hydrophobated silica, and which may also be contained on the pre-hydrophobating alkylsilica compound and with the diene based elastomer of the rubber composition.

For this evaluation, it is desired to partially pre-hydrophobate a precipitated silica by reaction of an alkylsilane, in a form of a halogenated alkylsilane or an alkoxyalkylsilane compound. By such partial pre-hydrophobation, it is desired that a significant content of residual unreacted hydroxyl groups on the precipitated silica remains available for subsequent reaction with a silica coupling agent in situ within a rubber composition and to thereby couple the precipitated silica to a conjugated diene elastomer contained in a rubber composition.

By such methodology, it is envisioned that dispersion of the precipitated silica in the rubber composition is promoted, followed by stabilization of the dispersed precipitated silica in the rubber composition and reinforcement of the rubber composition by the dispersed pre-hydrophobated precipitated silica is provided.

It therefore is desired to provide such partial pre-hydrophobation of precipitated silica with the alkylsilane exclusive of silica coupling agent during such pre-hydrophobation to prevent an inherent competition of the alkylsilane with silica coupling agent for hydroxyl groups on the precipitated silica during such pre-hydrophobation.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention a method is provided which comprises:

(A) providing a dispersion of a partially pre-hydrophobated a precipitated silica in a rubber composition containing at least one conjugated diene based elastomer, wherein said partially pre-hydrophobated precipitated silica is prepared by:

(1) reacting a halogenated alkylsilane or an alkoxyalkylsilane with a portion of hydroxyl groups on a precipitated silica to thereby provide a partially pre-hydrophobated precipitated silica containing residual (unreacted) hydroxyl groups and blending said partially pre-hydrophobated precipitated silica with a rubber composition containing at least one conjugated diene based elastomer to provide a dispersion thereof in said rubber composition, or (2) blending a precipitated silica with a rubber composition containing at least one diene based elastomer to provide a dispersion thereof in said rubber composition and reacting said dispersed precipitated silica with an alkoxyalkylsilane in situ within said rubber composition to thereby provide a partially pre-hydrophobated precipitated silica (B) stabilizing said dispersion of partially pre-hydrophobated precipitated silica within said rubber composition and reinforcing said rubber composition by reacting a silica coupling agent with said residual hydroxyl groups of said partially pre-hydrophobated precipitated silica in situ within the rubber composition subsequent to and thereby separate from said partial pre-hydrophobation of said precipitated silica with said halogenated alkylsilane or alkoxyalkylsilane, wherein said silica coupling agent contains a moiety reactive with said residual hydroxyl groups of said partially pre-hydrophobated precipitated silica and another different moiety interactive with said conjugated diene based elastomer(s) of said rubber composition;

wherein the alkyl silane (compound) for pre-hydrophobation of said precipitated silica is of the general Formula (I)

wherein R is an alkyl radical having from 1 to 10, alternately from one to 8, carbon atoms such as, for example, methyl, ethyl, isopropyl, n-butyl, octyl and octadecyl radicals, n is a value of from one to three and X is a radical selected from halogen, particularly comprised of chlorine or bromine, preferably a chlorine radical, and alkoxy radicals or groups, wherein said alkoxy radical is $(R^1O)$—, wherein $R^1$ is an alkyl radical comprised of from 1 to 3 carbon atoms such as, for example, methyl, ethyl and isopropyl radicals, of which at least one of which is desirably an ethyl radical. Said halogenated alkylsilane is desirably a chlorinated alkylsilane.

The amount of the halogenated alkylsilane or alkoxyalkylsilane for said partial pre-hydrophobation of the precipitated silica may be estimated, for example, by calculating the number of surface hydroxyls on the silica. Precipitated silicas are shown to have approximately 4.6 to 4.9 hydroxyl groups per square nanometer of surface area, independent of the surface area and structure of the silica (L. T. Zhura: *Colloids and Surfaces*, A: Physicochem. Eng. Aspects 173 (2000) 1 through 38). For example, 1 gram of silica with a surface area of 160 meters$^2$/gram would have $1.6 \times 10^{20}$ square nanometers of surface area. This would relate to $7.36 \times 10^{20}$ hydroxyl groups or $1.22 \times 10^{-3}$ moles of hydroxyl groups. It is assumed that one halogenated or alkoxy group of the hydrophobating alkylsilane compound will react with the surface area of the silica, therefore, on this basis, the amount of hydrophobating compound (the halogenated alkylsilane or alkoxyalkylsilane) to be added is less than $1.22 \times 10^{-3}$ moles of hydrophobating compound per gram of silica.

As indicated, in one embodiment, the precipitated silica is partially pre-hydrophobated by reaction with a halogenated alkylsilane or alkoxyalkylsilane to form a composite thereof prior to its addition to a rubber composition containing a diene based elastomer(s).

As indicated, in one embodiment, the precipitated silica is partially pre-hydrophobated by reaction with an alkoxysilane to form a composite thereof in situ within a rubber composition containing a diene based elastomer(s).

In further accordance with this invention, a rubber composition is provided prepared by said method, particularly a sulfur cured rubber composition.

In additional accordance with this invention, a rubber composition is provided comprised of, based on parts by weight per 100 parts by weight (phr) of conjugated diene based elastomer, (A) at least one conjugated diene-based elastomer, (B) about 10 to about 120, alternately about 40 to about 100, phr of reinforcing filler comprised of a combination of rubber reinforcing carbon black and precipitated silica comprised of:

(1) up to about 60, alternately up to about 15, phr of rubber reinforcing carbon black, and (2) precipitated silica comprised of:

(a) partially pre-hydrophobated precipitated silica with an alkylsilane comprised of halogenated alkylsilane or alkoxyalkylsilane where said partially hydrophobated precipitated silica contains residual (unreacted) hydroxyl groups, and (b) optionally up to about 30, alternately optionally up to about 20, phr of precipitated silica (precipitated silica which is not pre-hydrophobated), and (C) silica coupling agent having a moiety (e.g. alkoxysilane) reactive with said residual hydroxyl groups on said partially pre-hydrophobated precipitated silica and another different moiety (e.g. polysulfide or mercapto based moiety) interactive with said diene-based elastomer(s), wherein said alkyl silane for pre-hydrophobation of said precipitated silica is of the general Formula (I)

wherein R is an alkyl radical having from 1 to 10, alternately from 1 to 8, carbon atoms such as, for example, methyl, ethyl, isopropyl, n-butyl, octyl and octadecyl radicals, n is a value of from 1 to 3 and X is a radical selected from halogen, particularly comprised of chlorine or bromine, preferably a chlorine radical, and from alkoxy radicals, wherein said alkoxy radical is $(R^1O)$—, wherein $R^1$ is an alkyl radical comprised of from 1 to 3 carbon atoms such as, for example, methyl, ethyl and isopropyl radicals, of which at least one of which is desirably an ethyl radical.

In one embodiment, said rubber composition is sulfur cured.

Representative various alkyl silanes (alkylsilane compounds) of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, diethoxy dimethyl silane, trichlorooctyl silane, trichlorooctadecylsilane, and trichlorpropylsilane.

In further accordance with this invention, a tire of this invention is provided which contains a component comprised of said rubber composition. Representative of such tire component is, for example, a tire tread such including at least one of tread cap and/or tread base rubber layer, tire sidewall, tire carcass component such as for example a carcass cord ply coat, tire sidewall stiffening insert, an apex adjacent to or spaced apart from a tire bead, tire chafer and tire bead component.

It is understood that the tire component may be provided as a sulfur cured rubber composition.

A significant aspect of this invention is providing a rubber composition with a combination of a more readily dispersible alkylsilane partially pre-hydrophobated precipitated silica in the rubber composition which contains residual (unreacted) hydroxyl groups which is subsequently coupled to a diene-based elastomer in situ in the rubber composition by reaction of a silica coupling agent with said residual hydroxyl groups on said partial pre-hydrophobated precipitated silica wherein the reaction of said coupling agent is separate from, and thereby decoupled from, said alkylsilane partial pre-hydrophobation of said precipitated silica.

In the practice of this invention, the rubber composition may be comprised of various conjugated diene based elastomers. Such diene-based elastomers may be polymers and copolymers of conjugated dienes, such as, for example, isoprene and 1,3-butadiene, and copolymers of at least one conjugated diene hydrocarbon with styrene.

For example, representative of such elastomers are cis 1,4-polyisoprene rubber (natural and synthetic), cis 1,4-polybutadiene rubber, high vinyl polybutadiene rubber having a vinyl 1,2 content in a range of about 10 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 10 to about 90 percent based on its polybutadiene derived portion and a polystyrene content in a range of about 10 to about 60 percent based upon the copolymer, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

Organic solvent polymerization prepared tin coupled elastomers such as for example, tin coupled styrene/butadiene copolymers may also be used.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well known to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example and not intended to be limiting, in U.S. Pat. No. 5,064,901.

The precipitated silica reinforcement may, for example, be characterized by having a BET surface area, as measured using nitrogen gas, in the range of, for example, about 40 to about 600, and more usually in a range of about 50 to about 300, square meters per gram. The BET method of measuring surface area might be described, for example, in the *Journal of the American Chemical Society*, Volume 60, as well as ASTM D3037.

Representative examples of rubber reinforcing carbon blacks are, for example, and not intended to be limiting, referenced in *The Vanderbilt Rubber Handbook*, 13$^{th}$ edition, 1990, on Pages 417 and 418 with their ASTM designations.

Precipitated silicas are synthetic amorphous silicas such as, for example, and not intended to be limiting, various commercially available precipitated silicas from PPG Industries under the Hi-Sil trademark with designations 210, 243, 315 etc., silicas from Solvay with, for example, designations of Zeosil 1165MP and Zeosil 165GR, silicas from Evonik with, for example, designations VN2 and VN3 and chemically treated precipitated silicas such as for example Agilon™ 400 from PPG.

Such precipitated silicas may, for example, be characterized by having a nitrogen surface area (BET test) in a range, for example, about 100 to about 300, and more usually about 130 to about 200 cc/100 g.

Representative of silica coupling agents for the precipitated silica are comprised of, for example;

(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an organoalkoxymercaptosilane, or (C) their combination.

Representative of such bis(3-trialkoxysilylalkyl) polysulfide is comprised of bis(3-triethoxysilylpropyl) polysulfide.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated, which is more primarily directed to a tire with a component of a rubber composition which contains the described particulate, alkyl silane pre-hydrophobated precipitated silica aggregates and silica coupling agent.

The tires can be built, shaped, molded and cured by various methods which will be readily apparent to those having skill in such art.

EXAMPLE I

Preparation and Use of Partially Pre-Hydrophobated Silica With Halogenated Alkylsilane Partially hydrophobated precipitated silica is prepared by reacting the following halogenated alkylsilanes with precipitated silica through hydroxyl groups on the precipitated silica as reported in the following Table A.

TABLE A

| Precipitated Silicas | Halogenated alkylsilane |
| --- | --- |
| Silica A (not pre-hydrophobated) | None |
| Silica B (pre-hydrophobated) | Trimethylchlorosilane |
| Silica C (pre-hydrophobated) | Trichloropropylsilane |
| Silica D (pre-hydrophobated) | Trichlorooctylsilane |
| Silica E (pre-hydrophobated) | Trichlorooctadecylsilane |
| Silica F (commercial treated silica) | Not applicable |

Preparation of Silica C: Trichloropropylsilane Treated Precipitated Silica

Particulate precipitated silica A was obtained as Zeosil 1165MP™ available from Solvay. The precipitated silica A in an amount of 440 grams was placed in a high speed blender for 3 minutes to break the silica into less compacted aggregates. A toluene suspension of the silica particles was prepared in a 2 liter resin kettle equipped with a Dean-Stark Trap. The toluene/silica suspension was refluxed with stirring and 21 ml of water was collected by azeotrope which represented about 4.7 percent by weight of the silica used to prepare the suspension.

Trichloropropylsilane was added drop-wise in amount of 85 grams to the refluxing suspension to partially hydrophobate the precipitated silica A. As the trichloropropylsilane was added while stirring the dispersion, the suspension became less viscous, more transparent and assumed an appearance of a solution as the hydrophobation of the precipitated silica continued. The stirring continued under reflux conditions for 2 hours and the mixture then cooled and filtered. The collected (namely filtered) partially hydrophobated silica was used for evaluation in rubber formulations illustrated in the following Table 1 and referred to as "Silica C".

The precipitated silica C was considered as being partially hydrophobated by reaction of the alkyl silane with hydroxyl groups on the precipitated silica whereby the alkyl groups attached to the precipitated silica being basically non-reactive and whereby the alkylsilane hydrophobated precipitated silica C itself being only minimally reactive to the extent of minimal remaining residual unreacted hydroxyl groups on the precipitated silica.

Silica B Preparation: Trimethylchlorosilane Treated Precipitated Silica

In a similar manner Silica B was prepared by treating (partially hydrophobating) 400 grams of the precipitated silica A with 60.5 grams of trimethylchlorosilane.

Silica D Preparation: Trichlorooctylsilane Treated Precipitated Silica

In a similar manner Silica D was prepared by treating (partially hydrophobating) 400 grams of the precipitated silica A with 85 grams of trichlorooctylsilane.

Silica E preparation: Trichlorooctadecylsilane Treated Precipitated Silica

In a similar manner Silica E was prepared by treating (partially hydrophobating) 450 grams of the precipitated silica A with 60.5 grams of trichlorooctadecylsilane.

Preparation of Rubber Compositions (Rubber Samples)

Rubber compositions (referred to herein as rubber Samples A through E), were prepared which contained the untreated precipitated silica A (Control rubber Sample A) and treated (partially hydrophobated) silicas B through E as Experimental rubber Samples B through E.

Control rubber Sample A was prepared with untreated precipitated silica A as Zeosil 1165MP™ from Solvay which was not hydrophobated and is considered herein as being a reactive precipitated silica through its hydroxyl groups.

Experimental rubber Samples B through E were prepared with the above referenced partially pre-hydrophobated precipitated silicas B through E.

Experimental rubber Samples F and G were prepared with chemically treated silica obtained as Agilon 400™ from PPG comprised of an precipitated silica treated with an alkoxyorganomercaptosilane.

The rubber compositions were prepared by mixing diene-based elastomers and compounding ingredients including precipitated silicas in a first non-productive mixing step, or stage, (NP) in an internal rubber mixer for about 4 minutes to a temperature of about 160° C. The resulting rubber mixtures were dumped from the mixer and allowed to cool and subsequently mixed in an internal rubber mixer with a sulfur and sulfur cure accelerator(s) to a temperature of about 110° C. as a productive mixing step, or stage (P).

The basic formulation for the rubber Samples is illustrated in the following Table 1 and expressed in terms of parts by weight per hundred parts by weight rubber (phr) unless otherwise indicated.

TABLE 1

| | phr |
|---|---|
| Non-Productive Mixing Stage (NP) | |
| Styrene/butadiene rubber[1] | 70 |
| Cis 1,4-polybutadiene rubber[2] | 30 |
| Rubber reinforcing carbon black (N330)[3] | 5.2 |
| Fatty acid[4] | 3 |
| Antioxidant, amine based | 2 |
| Rubber processing oil | 20 |
| Wax, microcrystalline | 1.5 |
| Silica coupling agent[5] | 5.2 (control) and 2 |
| Precipitated or partially pre-hydrophobated precipitated silica | 65 |
| Productive Mixing Stage (P) | |
| Zinc oxide | 1.5 |
| Sulfur | 1.5 (control) and 1.7 |
| Sulfur cure accelerator(s)[6] | 3 |

[1]Organic solvent solution polymerization prepared styrene/butadiene rubber having a bound styrene content of about 16 percent as SLF16S42™ from The Goodyear Tire & Rubber Company
[2]Cis 1,4-polybutadiene rubber as Budene™ 1207 from The Goodyear Tire & Rubber Company
[3]Rubber reinforcing carbon black as N330, an ASTM designation
[4]Fatty acid comprised of stearic, palmitic and oleic acids
[5]Silica coupling agent as Si266 a liquid bis(3-triethoxysilylpropyl) polysulfide having an average of from about 2 to about 2.6 connecting sulfur atoms in its polysulfidic bridge
[6]Sulfur cure accelerator(s) as sulphenamide and diphenylguanidine Samples of the rubber compositions were prepared by blending the ingredients in an internal rubber mixer using two separate, sequential mixing stages, or steps, namely a first non-productive mixing stage (NP) to a relatively high temperature followed by a second, productive, mixing stage (PR) to a significantly lower mixing temperature in which the sulfur and sulfur cure accelerator were added. Such rubber mixing procedure is well known to those having skill in such art.

For the non-productive mixing stage (NP), the ingredients were mixed for about 4 minutes to an autogeneously generated temperature via the high shear mixing in the internal rubber mixer to a drop temperature of about 160° C. at which the mixed rubber is "dropped" or removed from the internal rubber mixer. The batch of mixed rubber is sheeted out and allowed to cool to a temperature below 40° C. The batch is then mixed in a productive mixing stage (PR), in which free sulfur and vulcanization accelerator(s) are added, for a period of about 2 minutes to a drop temperature of about 100° C.

The cure behavior and various cured physical properties of the respective Samples are shown in the following Table 2. For the cured rubber Samples, the Samples were individually cured for about 30 minutes to a temperature of about 150° C.

TABLE 2

| | Samples | | | | | | |
|---|---|---|---|---|---|---|---|
| | Control | Experimental | | | | | |
| | A | B | C | D | E | F | G |
| Silica coupling agent | 5 | 2 | 2 | 2 | 2 | 0 | 2 |
| Precipitated silica (A) | 65 | 0 | 0 | 0 | 0 | 0 | 0 |
| Trimethylchlorosilane treated silica (Silica B) | 0 | 65 | 0 | 0 | 0 | 0 | 0 |
| Trichloropropyosilane treated silica (Silica C) | 0 | 0 | 65 | 0 | 0 | 0 | 0 |
| Trichlorooctyl treated silica (Silica D) | 0 | 0 | 0 | 65 | 0 | 0 | 0 |
| Trichlorooctadecyl treated silica (Silica E) | 0 | 0 | 0 | 0 | 65 | 0 | 0 |
| Commercial treated silica (Silica F) | 0 | 0 | 0 | 0 | 0 | 65 | 65 |
| Properties | | | | | | | |
| RPA (Rubber Process Analyzer) | | | | | | | |
| Storage modulus (G') | | | | | | | |
| Uncured rubber 100° C., 1 Hz, kPa | 179 | 171 | 212 | 138 | 111 | 166 | 167 |
| Cured rubber 150° C., 11 Hz, 10%, kPa | 1095 | 1259 | 1467 | 1107 | 802 | 872 | 872 |
| Tan delta, 100° C., 10% strain | 0.087 | 0.077 | 0.83 | 0.09 | 0.76 | 0.76 | 0.083 |
| Curing Information | | | | | | | |
| Delta torque (dNm) | 16 | 18 | 19 | 16 | 11 | 20 | 11 |
| Physical Properties (Stress Strain) | | | | | | | |
| Tensile strength (MPa) | 15 | 11 | 11 | 9 | 7 | 11 | 11 |
| Ultimate elongation (%) | 510 | 457 | 409 | 507 | 557 | 431 | 390 |
| 100% modulus, ring, (MPa) | 1.7 | 2 | 2.3 | 1.5 | 1.2 | 1.5 | 1.7 |
| 300% modulus, ring, (MPa) | 7.2 | 6.8 | 7.9 | 4.8 | 3.5 | 6.7 | 7.85 |

From Table 2 it can be seen that the cured rubber G' values for the Experimental rubber Samples B, C and D (using the partially pre-hydrophobated precipitated silica) were significantly greater than the G' values for Control rubber Sample A (using the untreated precipitated silica), wherein the G' values for Experimental rubber Samples D and E (using the octyl silane and octadecyl silane partially hydrophobated precipitated silica) were significantly lower than the G' value for Control rubber Sample A. Possibly the longer alkyl chains of the alkylsilanes used for partially pre-hydrophobated Silicas D and E may prevent or retard some network formation between the residual hydroxyl groups of the partially hydrophobated precipitated silica and silica coupler and cross linked elastomer network.

The cured G' at 10 percent strain values (low strain values) of the rubber Samples may sometimes be referred to as "low strain stiffness" values. The higher low strain stiffness of Experimental rubber Samples B, C and D (as compared to Control rubber Sample A) is considered to be an important predictive handling performance indicator for a tire tread of such rubber composition, with a higher G' value considered to be a predictor of better handling performance of the tire tread.

In contrast, the Experimental rubber Samples F and G with the alkoxyorganomercaptosilane treated precipitated silica F have significantly lower comparative G' values and thereby a significantly lower comparative predictive handling performance indicator for a tire tread of such rubber composition.

This is considered to be a surprising discovery. It is apparent that the hydrophobated precipitated silica F contains only minimal or minimally accessible residual hydroxyl groups.

Further, is it surprisingly seen that the RPA values at low 10 percent strain for Experimental rubber Samples B, C and D, containing the coupled alkyl silane partially pre-hydrophobated silicas B, C and D with only 2 phr of the silica coupler:

(A) somewhat match the low strain tan delta value for Control rubber Sample A containing the non-hydrophobated precipitated silica A with its much higher reactive silica coupler concentration of 5 phr, and (B) have significantly higher cured G' values than Samples F and G which contain chemically treated silica F.

It is important to appreciate that Experimental rubber Samples F and G contain a commercially chemically treated precipitated silica wherein it is considered that hydroxyl groups (silanol groups) on the precipitated silica are either previously reacted or not accessible for further reaction in the rubber composition. In particular, Experimental rubber Sample G had silica coupler added to it during mixing whereas Experimental rubber Sample G did not contain an added silica coupler. The indicated physical properties for Experimental rubber Sample G with added coupler exhibited little to no change as compared to Experimental rubber Sample F. This demonstrates that if the silanol (hydroxyl) groups on the treated (hydrophobated) silica are not available (e.g. pre-reacted) or not accessible for further reaction as evidenced by very little change in cured rubber properties occurring by addition of the silica coupling agent.

This discovery is considered as being important in a sense that hysteresis was maintained or reduced (evidenced by maintenance or reduction in tan delta values) for rubber Samples B, C and D by simply using a partially pre-hydrophobated precipitated silica to promote a combination of dispersion of the precipitated silica in the rubber composition and reinforcement of the rubber composition by reaction of a silica coupler with residual hydroxyl groups on the partially hydrophobated precipitated silica, particularly by using only a very small silica coupling agent being added to the rubber composition to react with the residual hydroxyl groups on the partially pre-hydrophobated precipitated silica.

Evaluation of Residual Hydroxyl Groups on Partially Hydrophobated Precipitated Silica The presence of hydroxyl groups was evaluated for both untreated precipitated silica A and partially pre-hydrophobated precipitated silicas B through D. The evaluation was conducted by NMR analysis (Nuclear Magnetic Resonance analysis, $Si^{29}$ CPMAS NMR).

As indicated, silica Control Sample A is an untreated precipitated silica as Zeosil 1165MP™ from Solvay.

Silica Experimental Sample B is Zeosil 1165MP™ precipitated silica A partially hydrophobated with trimethylchlorosilane as previously referred to in this Example.

Silica Experimental Sample C is Zeosil 1165MP™ precipitated silica partially hydrophobated with trichloropropylsilane as previously referred to in this Example.

Silica Experimental Sample D is Zeosil 1165MP™ precipitated silica partially hydrophobated with trichlorooctylsilane as previously referred to in this Example.

In the following Table 3, results of the NMR evaluation are presented for the Control untreated precipitated silica A and Experimental partially hydrophobated precipitated silicas B, C and D for their hydroxyl contents as Q1, Q2 and Q3 structures from the NMR analysis. The Q4 structure is not an hydroxyl containing structure.

The reported Q1 structure represents the presence of —Si—(OSi)(OH)$_3$.

The reported Q2 structure represents the presence of —Si—(OSi)$_2$(OH)$_2$.

The reported Q3 structure represents the presence of —Si—(OSi)$_3$(OH).

The reported Q4 structure represents the presence of —Si—(OSi)$_4$.

The reported T1 structure represents the presence of C—Si—(OSi)(OH/ET)$_2$.

The reported T2 structure represents the presence of C—Si—(OSi)$_2$(OH/Et).

The reported T3 structure represents the presence of C—Si—(OSi)$_3$.

Control Silica A is Zeosil 1165MP™, a precipitated silica from Solvay

Experimental Silica B is Silica A partially hydrophobated with Trimethylchlorosilane Experimental Silica C, is Silica A partially hydrophobated with Trichloropropyosilane Experimental Silica D, is Silica A partially hydrophobated with Trichlorooctylsilane

TABLE 3

| Silica Structures | Control Silica A | Experimental Silica B | Experimental Silica C | Experimental Silica D |
|---|---|---|---|---|
| Q1 —Si—(OSi)(OH)$_3$ | 2 | 0 | 0 | 0 |
| Q2 —Si—(OSi)$_2$(OH)$_2$ | 13 | 6 | 6 | 7 |
| Q3 —Si—(OSi)$_3$(OH) | 65 | 47 | 44 | 58 |
| Q4 —Si—(OSi)$_4$ | 20 | 20 | 23 | 21 |
| T1 C—Si—(OSi)(OH/Et)$_2$ | 0 | 0.7 | 0.1 | 0.4 |
| T2 C—Si—(OSi)2(OH/Et) | 0 | 12 | 10 | 8 |
| T3 C—Si—(OSi)$_3$ | 0 | 14 | 18 | 6 |

As indicated, the percent of hydroxyl groups on precipitated silica samples is measured by $Si^{29}$ CPMAS NMR.

The Q1 through Q3 structures in Table 3 report the presence of original hydroxyl group structures on the precipitated silica A and residual hydroxyl group structures on partially hydrophobated silicas B, C and D.

It can be seen from Table 3 that a large percentage of the original hydroxyl (OH) groups remain on silicas B through D after partial hydrophobation of the original untreated precipitated silica A, particularly of the —Si—(OSi)$_2$(OH)$_2$, —Si—(OSi)$_3$(OH) and —Si—(OSi)$_4$ configurations or structures. Such remaining hydroxyl groups are sometimes referred to herein as residual hydroxyl groups.

It can further be seen that a large content of remaining, or residual, unreacted hydroxyl group structures is of the —Si—(OSi)$_3$(OH) structure which ranged from about 70 to about 90 percent of its original structural content, as well as the —Si—(OSi)$_2$(OH)$_2$ structure which represented about 50 percent of its original structural content, which represent residual hydroxyl groups for eventual reaction with silica coupler in situ within the rubber composition. With such residual (remaining) active hydroxyl contents, it can be concluded that this evaluation effectively provided a partial hydrophobation of the precipitated silica with the alkylsilane.

The intent of this Example was accomplished to both partially pre-hydrophobate the precipitated silica to promote its dispersibility in the rubber composition yet leave a significant content of residual hydroxyl groups on the precipitated silica unreacted and thereby available and accessible to react with a silica coupler in situ within the rubber composition to both "fix", or stabilize, the dispersion of precipitated silica within the rubber composition and also to provide filler reinforcement (coupled precipitated silica reinforcement to the rubber composition) for the rubber composition.

It is concluded that this evaluation was successful in partially pre-hydrophobating the precipitated silica with an alkylsilane in a form of halogenated (chlorinated) alkylsilane in a manner to leave a significant portion of the hydroxyl groups of the precipitated silica unreacted and thereby available for subsequent reaction with a silica coupling agent with which a silica coupling agent successfully reacted with the residual hydroxyl groups of the pre-hydrophobated precipitated silica.

EXAMPLE II

Preparation and Use of Partially of In-Situ Pre-Hydrophobated Silica With Alkoxysilane Partially hydrophobated precipitated silica is prepared by reacting an alkoxyalkylsilane with precipitated silica through hydroxyl groups on the precipitated silica as reported in the following Table B.

TABLE B

| Precipitated Silica | Alkoxyalkylsilane |
|---|---|
| Silica H (not pre-hydrophobated) | None |
| Silica I (pre-hydrophobated silica H) | Octyltriethoxysilane |

Preparation of Silica I: Octyltriethoxysilane In-Situ Hydrophobated Precipitated Silica The in-situ hydrophobation of a Control precipitated Silica H as Zeosil 1165MP™ from Solvay to form Experimental partially pre-hydrophobated Silica I was carried out in an internal rubber mixer using a separate initial non-productive mix cycle in which the rubber, silica, hydrophobating agent, and other non-productive ingredients are added together in the mixer and mixed for about 4 minutes to a drop temperature of about 160° C. A second separate non-productive mix cycle is used to subsequently add the coupling agent to the rubber containing the partially pre-hydrophobated silica. This mix cycle is carried out for about 4 minutes with a drop temperature of about 160° C. The final mix stage is a normal productive mix cycle, in which free sulfur and vulcanization accelerator(s) are added, for a period of about 2 minutes to a drop temperature of about 100° C.

The basic formulation for the Experimental rubber Sample I containing Experimental partially pre-hydrophobated Silica I is illustrated in the following Table 4 and expressed in terms of parts by weight per hundred parts by weight rubber (phr) unless otherwise indicated.

TABLE 4

|  | phr |
|---|---|
| Non-Productive Mixing Stage (NP1) | |
| Styrene/butadiene rubber[1] | 100 |
| Rubber reinforcing carbon black (N330)[2] | 4 |
| Fatty acid[3] | 3 |
| Antioxidant, amine based | 2 |
| Rubber processing oil | 25 |
| Wax, microcrystalline | 1.5 |
| Silica hydrophobating agent[4] | 0, 6.4 |
| Silica I (partially hydrophobated precipitated Silica H) | 80 |
| Non-Productive Mixing Stage (NP2) | |
| Silica coupling agent[5] | 6.4 |
| Productive Mixing Stage (P) | 1.5 |
| Zinc oxide | |
| Sulfur | 1.7 |
| Sulfur cure accelerator(s)[6] | 4.7 |

[1]Organic solvent solution polymerization prepared functionalized styrene/butadiene rubber from the Trinseo Company as SPRINTAN SLR 4602 understood to contain functional groups comprised of at last one of siloxy and thiol groups
[2]Rubber reinforcing carbon black as N330, an ASTM designation
[3]Fatty acid comprised of stearic, palmitic and oleic acids
[4]octyltriethoxysilane
[5]Silica coupling agent as Si266 a liquid bis(3-triethoxysilylpropyl) polysulfide having an average of from about 2 to about 2.6 connecting sulfur atoms in its polysulfidic bridge
[6]Sulfur cure accelerator(s) as sulphenamide and diphenylguanidine The cure behavior and various cured physical properties of the respective Samples are shown in the following Table 5. For the cured rubber Samples, the Samples were individually cured for about 30 minutes to a temperature of about 150° C.

TABLE 5

|  | Samples | |
|---|---|---|
|  | Control H | Experimental I |
| Precipitated silica (H) | 80 | 0 |
| Silica I (partially hydrophobated Silica H) | 0 | 80 |
| Silica coupling agent | 6.4 | 6.4 |
| Properties | | |
| RPA (Rubber Processing Analyzer) | | |
| Storage modulus (G') | | |
| Uncured rubber 100° C., 1 Hz, kPa | 288 | 228 |
| Cured rubber 150° C., 11 Hz, 10%, kPa | 1274 | 1313 |
| Tan delta, 100° C., 10% strain | 0.092 | 0.063 |

TABLE 5-continued

| | Samples | |
|---|---|---|
| | Control H | Experimental I |
| Curing Information (RPA, 150° C.) | | |
| Delta torque (dNm) | 7.2 | 9.5 |
| Zwick Rebound | | |
| At 23° C. (%) | 33 | 37 |
| At 100° C. (%) | 70 | 71 |
| Physical Properties (Stress Strain) | | |
| Ultimate elongation (%) | 453 | 424 |
| 100% modulus, ring, (MPa) | 2 | 2 |
| 300% modulus, ring (MPa) | 11 | 10 |

The representative data shown in Table 5 demonstrates the advantages of pre-partially hydrophobating the precipitated silica in situ within the rubber composition prior to and separate from reaction of its residual hydroxyl groups with a silica coupler.

In this Example, the amount of coupling agent added is the same for the rubber composition (rubber Sample I) containing the pre-hydrophobated silica (Silica I) and the control rubber Sample H containing the precipitated silica (Silica H) without such pre-partial hydrophobation.

The data in Table 5 shows a lower uncured G' for the rubber composition (rubber Sample I) with the pre-partially hydrophobated precipitated silica (Silica I) compared to the control rubber Sample (H) containing the Silica H which was not pre-hydrophobated. This lower uncured G' value is indicative of an easier to process uncured rubber composition. The cured G' at 10% strain (a low strain stiffness) is higher for the Experimental rubber composition Sample I which contains the pre-partially hydrophobated silica. This increased cured low strain stiffness value for the rubber composition containing the pre-partially hydrophobated silica (rubber Sample I) is an indicator for improved tire handling for a tire with a tread of such rubber composition. The cured tan delta value at 10 percent strain is lower for the rubber composition (rubber Sample I) containing the pre-partially hydrophobated silica (Silica I) as compared to the control rubber composition (rubber Sample H) containing the precipitated silica (Silica H) which has not been pre-hydrophobated. This lower tan delta value is a predictor of a tire with lower rolling resistance with a tread of such rubber composition.

The rebound value at room temperature is higher for the rubber composition (rubber Sample I) containing the pre-partially hydrophobated precipitated silica (Silica I) compared the rubber composition (rubber Sample H) containing the precipitated silica (Silica H) which has not been pre-hydrophobated. The higher rebound value is another predictor of a tire with lower rolling resistance having a tread of such rubber composition.

The reported Stress-Strain properties for both the rubber composition (rubber Sample I) containing the pre-partially hydrophobated silica and the control rubber composition (rubber Sample H) containing the precipitated silica which has not been hydrophobated are very similar, indicating that the toughness or durability of the cured rubber compositions are similar. This is important to recognize because generally when a rubber composition has a higher stiffness value (higher G' value or lower tan delta value) and lower hysteresis value (higher rebound value) as is seen in Table 5 for Experimental rubber Sample I compared to Control rubber Sample H, the toughness of the rubber composition (for Experimental rubber Sample I) would be expected to be lower. For Experimental rubber Sample I, however, the similar cured rubber tensile properties indicate similar toughness for Experimental rubber Sample I and Control rubber Sample H. This observation was an unexpected benefit of Experimental rubber Sample I.

It is thereby concluded that this evaluation was successful in partially pre-hydrophobating the precipitated silica with an alkylsilane in a form of alkoxyalkylsilane in situ within the rubber composition in a manner to leave a sufficient portion of the hydroxyl groups of the precipitated silica unreacted (residual hydroxyl groups) and thereby available for subsequent and separate reaction with a silica coupling agent with the residual hydroxyl groups of the partially pre-hydrophobated precipitated silica to promote reinforcement of the rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A method which comprises:
   (A) providing a dispersion of a partially pre-hydrophobated precipitated silica in a rubber composition containing at least one conjugated diene based elastomer and a combination of precipitated silica and rubber reinforcing carbon black, which consists of reacting said dispersed precipitated silica with triethoxyoctylsilane in situ within said rubber composition to thereby provide a partially pre-hydrophobated precipitated silica containing residual hydroxyl groups;
   (B) stabilizing said dispersion of partially pre-hydrophobated precipitated silica within said rubber composition and reinforcing said rubber composition by subsequently reacting a silica coupling agent with said residual hydroxyl groups of said partially pre-hydrophobated precipitated silica in situ within the rubber composition, wherein said silica coupling agent consists of a bis(3-triethoxysilylpropyl) polysulfide containing an average in a range of 2 to about 2.6 sulfur atoms in its connecting bridge.

2. A rubber composition prepared by the method of claim 1.

3. A sulfur cured rubber composition of claim 2.

4. A tire having a component comprised of the rubber composition of claim 3.

* * * * *